Aug. 9, 1927. 1,638,416
C. E. SMITH ET AL
PORTABLE CABBAGE CUTTING MACHINE
Filed Nov. 13, 1925  2 Sheets-Sheet 1
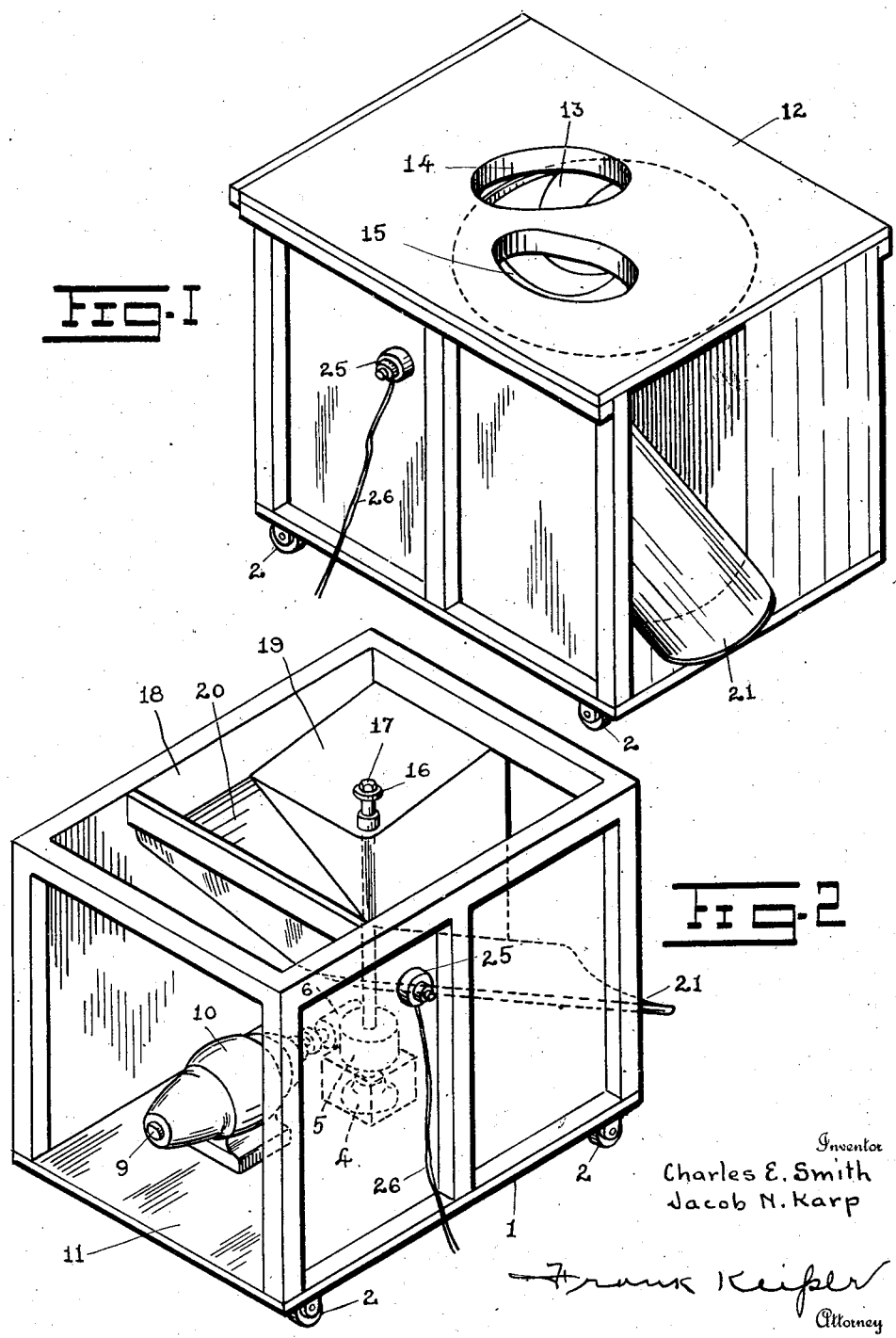
Inventor
Charles E. Smith
Jacob N. Karp
Frank Keifer
Attorney

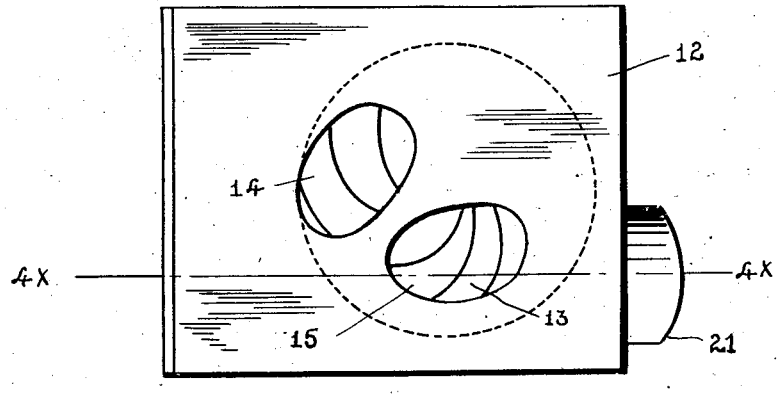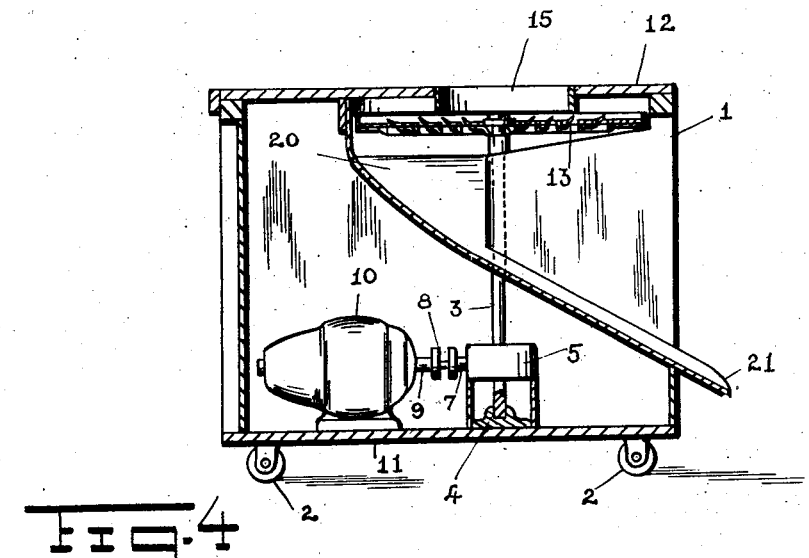

Patented Aug. 9, 1927.

1,638,416

UNITED STATES PATENT OFFICE.

CHARLES E. SMITH, OF GENEVA, AND JACOB N. KARP, OF FARMINGDALE, NEW YORK.

PORTABLE CABBAGE-CUTTING MACHINE.

Application filed November 13, 1925. Serial No. 68,909.

The object of this invention is to provide a new and improved type of portable cabbage cutting machine for use in the manufacture of sauerkraut, etc.

This and other objects of this invention will be fully illustrated in the drawings, described in the specification and pointed out in the claims at the end thereof.

In the accompanying drawing:

Figure 1 is a perspective view of the complete cabbage cutting machine.

Figure 2 is a perspective view of the machine with the top or cover and cutting knife removed therefrom.

Figure 3 is a top plan view of the machine.

Figure 4 is a vertical longitudinal section of the machine, the section being taken on the line 4x—4x of Figure 3.

In the several figures of the drawings like reference numerals indicate like parts.

Kraut is made from cabbage that is cut into thin strips and is salted and cured. Machines for cutting cabbage into kraut have heretofore been made fixed in place and have been driven by fixed pulleys and shaftings and were therefore not portable. This necessitated bringing the cabbage to the machine and taking the cut cabbage away from the machine to the receptacle in which it was packed and cured. In operating on a large scale this usually necessitated the placing of the cutting mechanism at a great distance from the place where the cabbage was stored and cured. To avoid this and make it possible to cut the cabbage at or near the vats where it is cured we have invented this machine which can be operated at the vat and moved from vat to vat and which is made so as to deliver the cut cabbage directly into the vat so that the cabbage is cut and handled with the least amount of labor cost and great saving in time.

In the drawings, reference numeral 1 indicates the box like frame mounted on casters 2, 2, provided at each corner thereof. In the machine is provided the vertical shaft or spindle 3 mounted to rotate in and supported by a thrust bearing 4 at the bottom of the casing. On this shaft is provided a worm gear 5 which is driven by a worm 6 provided on a short shaft 7 connected by a flexible joint 8 to the shaft 9 of an electric motor 10 which is mounted on the base 11 of the frame of the machine.

The machine is covered over with a removable top 12 under which revolves the revolving knife or cutters 13. This cutter is made up of a circular plate having a hub which plate has curved arms therein on each of which is fastened a curved blade leaving an opening below the edge of each of the knives. This top has two openings 14 and 15 therein which are elongated and made approximately of the same outline as the head of a cabbage when viewed sideways or when cut with a vertical section thru the center. This cutter 13 is fastened on the shaft 3 being keyed to the upper end thereof, and held thereon with a washer 16 and nut 17. The cutter rotates in a compartment 18 indicated in Figure 2. Below this compartment is the sloping table 19 thru one corner of which the spindle 3 passes, this table providing a fixed support or bearing for the upper end of the spindle. The table 19 slopes sufficiently so that the cut cabbage is discharged over the lower edge thereof, the cut cabbage moving thereon in the direction of the rotation of the knife, the table being sloped down in the direction of the rotation of the knife. From the compartment 18 also leads down the sloping chute 20 which bends around the shaft 3 and discharges the cut cabbage at the lower end 21 thereof. The machine will be placed so that the cut cabbage discharged from the chute 20 will be discharged directly into the vat where it will be cured.

The sloping chute 20 is formed to slope continuously and smoothly so that there will be no shoulder or ridge in any part thereof more especially at the corner where it bends around the shaft so that the cut cabbage will slide easily thereover. It has been found by experience that if a ridge or shoulder is left in the chute it will obstruct the flow of the cabbage and cause the cabbage to pile up at that point. To secure a smooth surface to the best advantage, the lower part of the chute is made concave or trough-like in cross section and the upper part of the chute is made to run tangentially into the curved surface of the lower part of the chute so as to merge therewith with an even surface having no obstructing ridge or shoulder therein. It will also be understood that the sloping table 19 forms a part of the delivery chute and while a shoulder appears between the lower end of the table and the chute 20, this is unavoidable because the table must be made to support the upper end of the shaft 3 and is not objectionable because the drag of the rotating knife pulls the cut cabbage after it so that it is discharged from the table into the chute 20. In this way it will be seen that the delivery chute extends around three sides of the rotating shaft.

By arranging the chute and the openings in the top of the machine in this way it is possible to place the cabbage heads on the top at the left hand end as shown in Figure 3 for which purpose the top is formed to give ample space at that end for the storing of uncut cabbage heads thereon. An operator stands on each of the long sides of the machines, as shown in Figure 3, one feeding a cabbage head into the opening 13 and the other feeding a cabbage head into the opening 14. The delivery chute 21 is on the opposite side of the machine from where the fresh cabbage is delivered to the machine thus making it possible to deliver the cut cabbage therefrom directly into the vats without re-handling and otherwise work the machine and floor space to the best possible advantage.

An electric switch 25 is provided which controls the operation of the motor 10 and a cable 26 is provided which connects the switch to any source of electric power. This makes it possible to place the machine wherever it may be desired to operate it.

We claim:

1. A kraut cutting machine, the combination of a casing, an upright shaft mounted therein, a top having one or more openings therein, a disc cutter mounted on said shaft and revolving under said openings, said openings being placed eccentric with the center of the disc, an inclined stationary delivery chute extending spirally under said openings and extending down to near the bottom of the casing and adapted to convey the cut cabbage by gravity from the cutter and discharge it outside the machine.

2. A kraut cutting machine, the combination of a casing, an upright shaft mounted therein, a top having one or more openings therein, a disc cutter mounted on said shaft and revolving under said openings, said openings being placed eccentric with the center of the disc, an inclined stationary delivery chute extending spirally under said openings and extending down to near the bottom of the casing and adapted to convey the cut cabbage by gravity from the cutter and discharge it outside the machine, means for driving said shaft and cutter located under said chute, said shaft passing through said chute and having a bearing therein.

3. In a kraut cutting machine, the combination of a casing, an upright shaft therein, a bearing in the bottom thereof supporting said shaft, a stationary table near the top of the machine on one corner thereof, said table sloping down toward the center of the machine, a bearing fixed in said table in which said shaft rotates.

4. In a kraut cutting machine, the combination of a casing, an upright shaft therein, a bearing in the bottom thereof supporting said shaft, a stationary table near the top of the machine on one corner thereof, said table sloping down toward the center of the machine, a bearing fixed in said table in which said shaft rotates, a cutter mounted on the upper end of said shaft to rotate therewith said cutter rotating over said table.

5. In a kraut cutting machine, the combination of a table having two feed openings therein, a knife revolving under both of said openings, a shaft supporting said knife, a feed chute arranged spirally under both of said openings and passing around said shaft and adapted to convey the cut cabbage from the knife to a receptacle outside of the machine.

6. In a kraut cutting machine, the combination of a frame, a shaft mounted upright in said frame, a cutter on the upper end of said shaft, an inclined stationary table arranged in one corner of said frame under said knife, said shaft passing through said table.

7. In a kraut cutting machine, the combination of a frame, a shaft mounted upright in said frame, a cutter on the upper end of said shaft, an inclined stationary table arranged in one corner of said frame under said knife, said shaft passing through said table, a chute adjacent to the lower end of said table running transversely thereto and around said shaft.

8. In a kraut cutting machine, the combination of a frame, a shaft mounted upright in said frame, a cutter on the upper end of said shaft, an inclined stationary table arranged in one corner of said frame under said knife, said shaft passing through said table, a cover on top of said machine having an opening therein above said knife.

9. In a kraut cutting machine, the combination of a frame, a shaft mounted upright in said frame, a cutter on the upper end of said shaft, an inclined stationary table arranged in one corner of said frame under said knife, said shaft passing through said table, an electric motor mounted in said frame having a shaft, a flexible coupling on the end of said shaft, a worm driven by said coupling, a worm gear on said upright shaft by which said shaft is driven.

In testimony whereof we affix our signatures.

CHARLES E. SMITH.
JACOB N. KARP.